(12) United States Patent
Matsumoto et al.

(10) Patent No.: US 7,235,951 B2
(45) Date of Patent: Jun. 26, 2007

(54) CHARGING APPARATUS

(75) Inventors: Naoaki Matsumoto, Tochigi (JP); Naoki Watanabe, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/363,486

(22) Filed: Feb. 28, 2006

(65) Prior Publication Data
US 2006/0202662 A1    Sep. 14, 2006

Related U.S. Application Data

(63) Continuation of application No. 10/878,260, filed on Jun. 29, 2004, now abandoned.

(30) Foreign Application Priority Data
Jul. 2, 2003   (JP)   ............... 2003-190644

(51) Int. Cl.
*H02J 7/16* (2006.01)
(52) U.S. Cl. .............. 320/155; 320/124; 320/133; 320/139
(58) Field of Classification Search ............. 320/124, 320/133, 139, 155
See application file for complete search history.

(56) References Cited

U.S. PATENT DOCUMENTS

| | | | | |
|---|---|---|---|---|
| 5,206,579 A | * | 4/1993 | Kawate et al. | 320/148 |
| 5,225,763 A | * | 7/1993 | Krohn et al. | 320/155 |
| 5,350,995 A | * | 9/1994 | Iketani | 320/155 |
| 5,363,312 A | * | 11/1994 | Ninomiya | 702/63 |
| 5,923,149 A | * | 7/1999 | Umetsu | 320/139 |
| 6,281,661 B2 | * | 8/2001 | Kaite et al. | 320/116 |

* cited by examiner

*Primary Examiner*—Karl Easthom
*Assistant Examiner*—Samuel Berhanu
(74) *Attorney, Agent, or Firm*—Oblon, Spivak, McClelland, Maier & Neustadt, P.C.

(57) ABSTRACT

There is provided a charging apparatus, which uses a charging control timer having a relatively simple constitution, capable of preventing an overcharge of a secondary battery while detecting the overcharge of the secondary battery even if a charge current value is relatively small. The charging apparatus that discontinues the charging in a preset expiration time period of a timer has a variable controller for controlling the preset expiration time period of a timer in response to an interrupted time if the charging operation that is interrupted before reaching the preset expiration time of a timer is started again.

5 Claims, 5 Drawing Sheets

F I G. 2
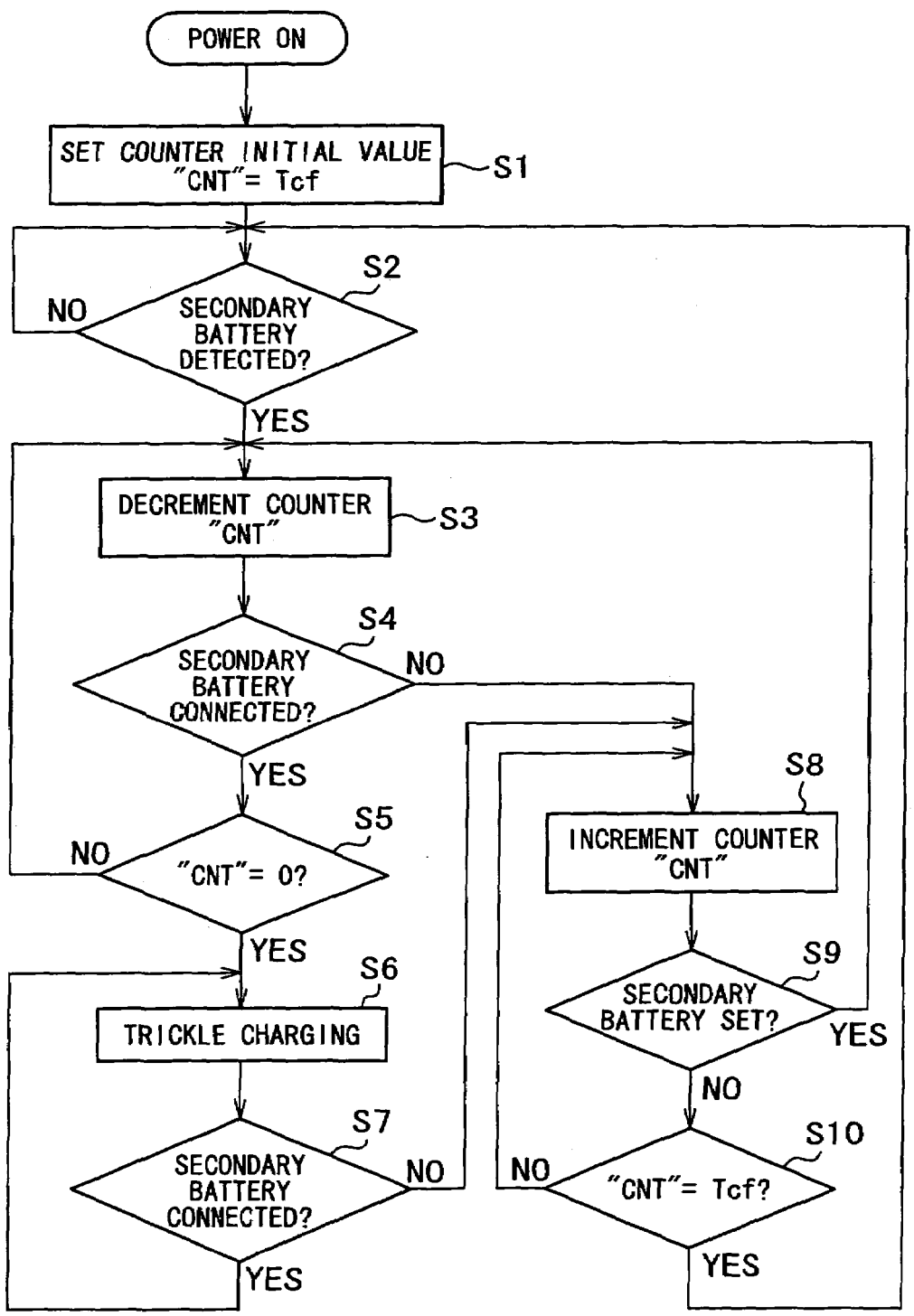

F I G. 5
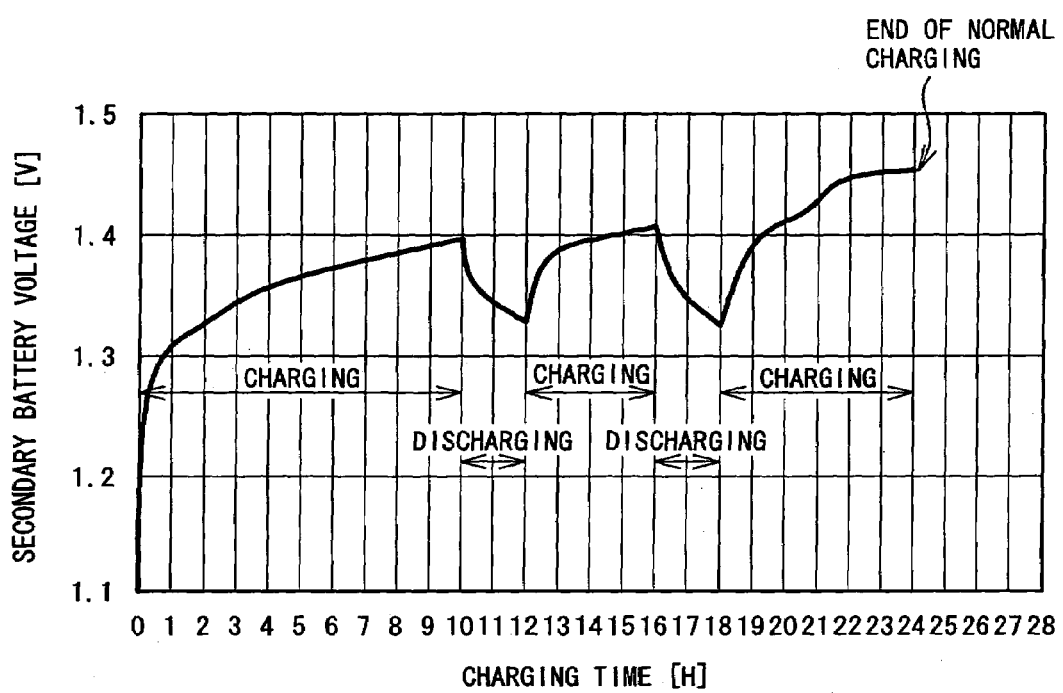
F I G. 6
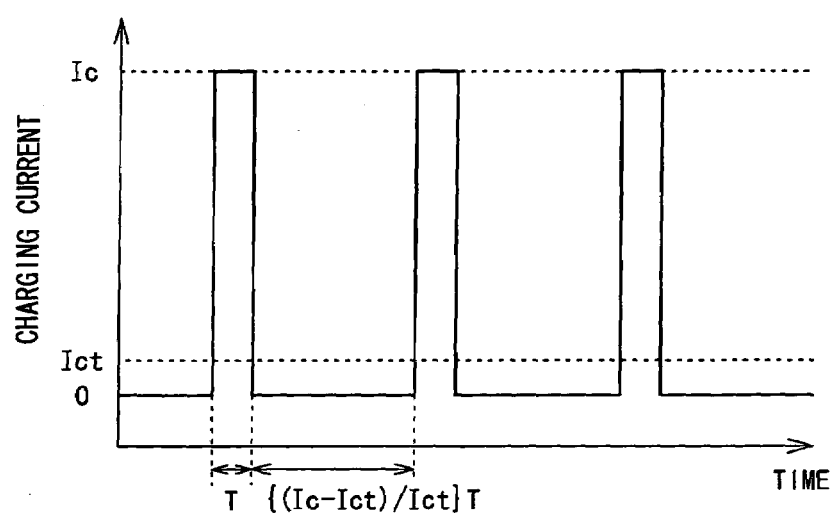

CHARGING APPARATUS

CROSS REFERENCES TO RELATED APPLICATIONS

The present invention claims priority to its priority document No. 2003-190644 filed in the Japanese Patent Office on Jul. 2, 2003, the entire contents of which being incorporated by reference herein.

BACKGROUND OF THE INVENTION

1. Field of the Invention

The present invention relates to a charging apparatus, and is more specifically to a charging apparatus that is capable of charging with a relatively small charging current.

2. Description of Related Art

In a charging apparatus for charging a secondary battery such as a nickel metal hydride battery or the like, it is typical to use, for example, a charging control timer in order to end charging operation at a predetermined constant time period after the start of charging operation (see Japanese Patent Application Publication No. S63-194533). Alternatively, charging may be terminated based on the judgment that the full charging is reached by detecting such phenomena as a minus delta V value ($-\Delta V$ detection) in voltage of the secondary battery which is being charged, a gradient of temperature rise of the battery (dT/dt detection), the upper limit of the temperature rise of the battery (TCO detection), and the like during the charging.

However, in case of terminating the charging after a predetermined constant time period is passed, if the secondary battery is recharged after use or interruption of the charging operation of such battery, the charging control timer is reset regardless of the amount of the battery capacity of the secondary battery decreased by discharging, thereby carrying out the charging operation again for the same predetermined constant time period from the new start of the charging operation before termination.

The constant charging time period is normally set to the time which is sufficient for charging a secondary battery, which has been discharged to the final discharge voltage, back to its rated capacity.

Accordingly, if the charging operation is repeated by starting the whole charging operation before discharging to the final discharge voltage, the battery may be overcharged, thereby causing inconvenience that may lead to degradation in performance of the secondary battery.

Japanese Patent Application Publication No. S63-194533 also discloses a technology which does not to reset the timer in case of short break of the AC power supply or the like during the charging operation of the secondary battery, but the timer is reset when the secondary battery is removed from the charger.

SUMMARY OF THE INVENTION

On the other hand, in order to detect the phenomena such as the minus delta V value, the gradient of temperature rise of the battery, the upper limit of the temperature rise of the battery and the like, the charging current must be relatively large, i.e., at least 0.5 C mA or larger (where, C is the rated capacity of the secondary battery) and thus not suitable for a charging apparatus with a small charging current.

Moreover, since these phenomena are not necessarily accurate and reliable for detecting the fully charged state, it is common to use these phenomena together with a charging control timer, thereby encountering the above mentioned inconvenience.

Accordingly, it is desirable to provide a charging apparatus using a charging control timer that has a relatively simple construction and is capable of detecting overcharging of the secondary battery even if the charging current is relatively small. The present invention is made in light of these circumstances.

According to an embodiment of the present invention, there is provided a charging apparatus that discontinues a charging operation at a preset expiration time period of a timer. The charging operation is provided with variable control means for controlling the preset expiration time period of a timer in response to an interrupted time if the charging operation that is interrupted before reaching the preset expiration time period of a timer is restarted.

According to the present embodiment, the charging apparatus is provided with the variable control means for controlling the preset expiration time period of a timer in response to an interrupted time if the charging operation that is interrupted before reaching the preset expiration time period of a timer is restarted. Accordingly, overcharging may be prevented even if the charging is once interrupted and restarted because the charging time is adjusted in response to an interrupted time or a discharge time of the secondary battery during the interruption.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 2 is a flowchart for describing an operation of one embodiment of the present invention;

FIG. 5 is a graph for describing one embodiment of the present invention;

FIG. 6 is a chart for describing one embodiment of the present invention; and

DETAILED DESCRIPTION OF THE EMBODIMENTS

Now, embodiments of the charging apparatus according to the present invention will be described hereunder with reference to the drawings.

Figure 1:
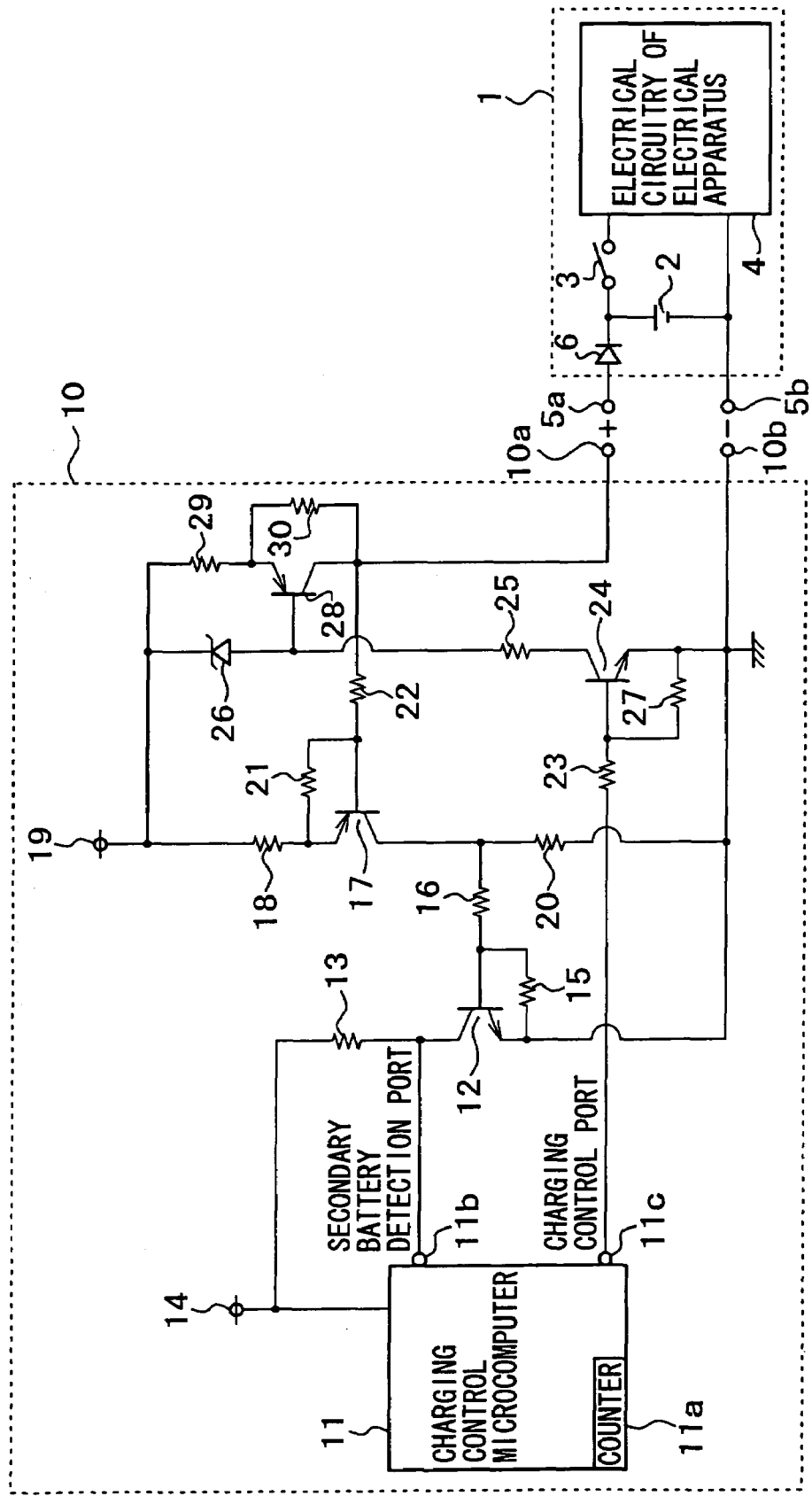
FIG. 1 is a circuit schematic of one embodiment of the charging apparatus according to the present invention.

FIG. 1 shows an example of construction of the charging apparatus according to the present embodiment and, in FIG. 1, represented by numeral 1 is an electrical apparatus which is constructed to operate on electrical power from a secondary battery 2, represented by numeral 3 is a power switch and represented by numeral 4 is an electrical circuitry of the electrical apparatus 1.

Moreover, represented by numeral 5a and numeral 5b are one and the other charging terminals which are designed to be connected to one and the other output terminals 10a and 10b of a charging apparatus 10 provided exclusively for the electrical apparatus 1, respectively. The one charging terminal 5a is connected to the plus electrode of the secondary battery 2 by way of a reverse current protection diode 6 while the minus electrode of the secondary battery 2 is connected to the other charging terminal 5b.

The charging apparatus 10, which is provided exclusively for the electrical apparatus 1, is provided with a charging control microcomputer 11 including a counter 11a which constitutes a charging control timer.

A secondary battery detection port 11b of the charging control microcomputer 11 is connected to the collector of an npn-type transistor 12 which is then connected to a power supply terminal for the microcomputer 14 for supplying positive DC voltage by way of a resistor 13. The emitter of the transistor 12 is connected to ground and also to the other output terminal 10b. The electrical power from the power supply terminal for microcomputer 14 is supplied to the charging control microcomputer 11.

The charging control microcomputer 11 makes a judgment that the secondary battery 2 is not connected if the secondary battery detection port 11b is high level "1", while making a judgment that the secondary battery 2 is connected if the secondary battery detection port 11b is low level "0".

A resistor 15 is connected between the base and the emitter of the transistor 12 and the base of the transistor 12 is connected to the collector of a pnp-type transistor 17 by way of a resistor 16.

The emitter of the transistor 17 is connected to a power supply terminal 19 that supplies positive DC voltage by way of a resistor 18 and the collector of the transistor 17 is connected to ground by way of a resistor 20.

A resistor 21 is connected between the base and the emitter of the transistor 17 and also the base of the transistor 17 is connected to the one output terminal 10a by way of a resistor 22.

In this case, when the one and the other output terminals 10a and 10b are connected to the one and the other charging terminals 5a and 5b, the transistor 17 turns on and also the transistor 12 turns on to make the secondary battery detection port 11b low level "0".

Also, the charging control port 11c of the charging control microcomputer 11 is connected to the base of an npn-type transistor 24 by way of a resistor 23 and the collector of the transistor 24 is connected to the power supply terminal 19 by way of a series circuit of a resistor 25 and a Zener diode 26.

The emitter of the transistor 24 is connected to ground and a resistor 27 is connected between the base and the emitter of the transistor 24.

The connection point of the Zener diode 26 and the resistor 25 is connected to the base of a pnp-type transistor 28, the emitter of the transistor 28 is connected to the power supply terminal 19 by way of a resistor 29 and a resistor 30 is connected between the emitter and the collector of the transistor 28. The collector of the transistor 28 is connected to the one output terminal 10a.

In this case, when the charging control microcomputer 11 detects that the secondary battery 2 is connected between the one and the other output terminals 10a and 10b, the charging control port 11c becomes high level "1" and the transistor 24 turns on to supply the bias current to the transistor 28, thereby causing the transistor 28 to supply the charging current to the secondary battery 2.

At this time, since the bias voltage of the transistor 28 is determined by the Zener diode 26 connected to the base of the transistor 28, the bias voltage of the transistor 28 remains unchanged regardless of the voltage of the secondary battery 2. In case when the resistance R2 of the resistor 30 is set sufficiently larger than the resistance R1 of the resistor 29, i.e., R2>>R1, the charging current (constant current) can be determined by the Zener voltage Vz of the Zener diode 26, the threshold voltage Vf component of the internal diode of the transistor 28 and the resistance R1 of the resistor 29.

The charging current Ic is determined by:

$$Ic=(Vz-Vf)/R1$$

If the rated capacity of the secondary battery 2 is C, the charging time required for full charging by the continuous charging is Tcf and the charging capacity is 130% of the rated capacity, the following relation is given:

$$C \times 1.3 = Ic \times Tcf$$

Now, the charging operation will be described by reference to the flowchart in FIG. 2 and FIG. 3 through FIG. 5.

Figure 3:
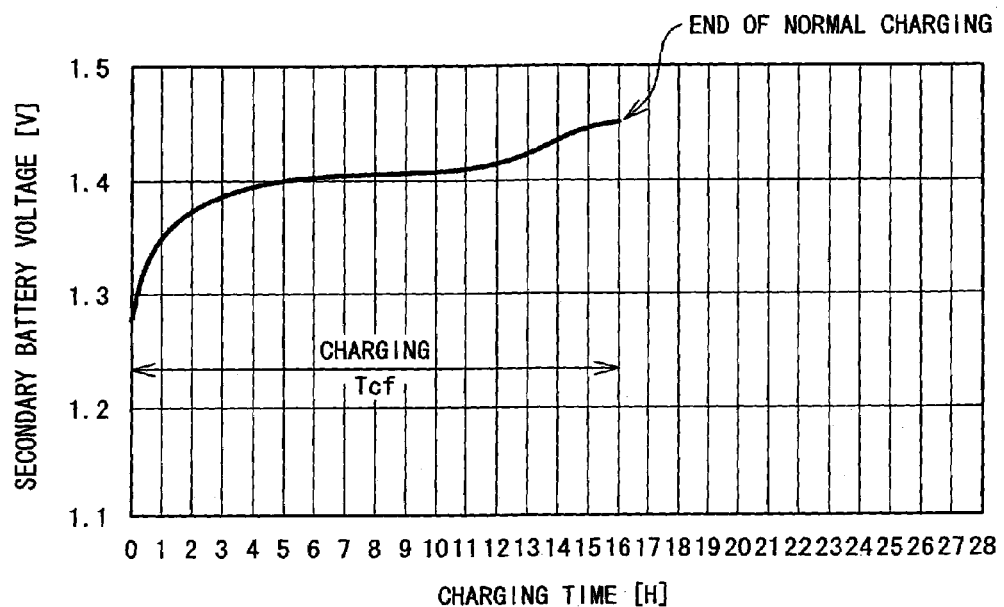
FIG. 3 is a graph for describing one embodiment of the present invention.

Firstly, description will be provided on a case of the continuous charging as shown in FIG. 3. When the power supply of the charging apparatus 10 is turned on, the full charging time Tcf required for fully charging the secondary battery 2 in the continuous charging is set to the counter 11a in the charging control microcomputer 11 as the initial value (step S1).

Then, judgment is made if the secondary battery detection port 11b of the charging control microcomputer 11 is low level "0", i.e., if the secondary battery 2 is connected (step S2). Subsequently, the counter 11a is decremented (step S3) and judgment is made if the secondary battery 2 remains connected (step S4). In case of the continuous charging as shown in FIG. 3, these steps S3 and S4 are repeated until the counter 11a reaches "0".

In this embodiment, if it is determined that the counter 11a becomes "0" (step 5), the normal charging is finished and a trickle charging is carried out thereafter (step S6).

In this case, judgment is made if the secondary battery 2 is connected (step S7), and the trickle charging is continued as long as the secondary battery 2 remains connected.

This is because, since self discharge takes place in the secondary battery 2 if it is left unused, after the full charging (fully charged condition) in this embodiment, the trickle charging is carried out in order to compensate for the self discharge.

Generally, the amount of self discharge of a secondary battery per day (24 hours) is several percent of the rated capacity. In this embodiment, the trickle charging is carried out in a pulsed charging.

At this time, if the amount of self discharge of the secondary battery 2 is N %, the rated capacity of the secondary battery 2 is C (mAh) and the average charging current in the trickle charging is Ict (mA), then the amount of the self discharge per day is C×0.01N and the average charging current Ict (mA) is given by:

$$Ict = (C \times 0.01N)/24$$

Moreover, if the normal charging current value is Ic (mA) and the optional time is T, the self discharge can be compensated by the pulsed charging (trickle charging) of the pulse of the high level time T and the low level time {(Ic−Ict)/Ict} T.

The trickle charging is achieved by outputting the pulse as shown in FIG. 6 from the charging control port 11c of the charging control microcomputer 11 in FIG. 1 so that the transistor 24 is turned on and off.

During the trickle charging, the count value of the counter 11a in the charging control microcomputer 11 is "0".

In the flowchart as shown in FIG. 2, when the electrical apparatus 1 is removed from the charging apparatus 10 and thus disconnecting the secondary battery 2 from the charging apparatus 10 at any time (in steps S4, S7), it goes to step S8, in which the count value of the counter 11a is incremented (Note that the maximum value of the counter 11a is equal to the count value of Tcf.).

In this case, judgment is made if the secondary battery 2 is connected (step S9). If the secondary battery is not connected, judgment is made whether or not the count value of the counter 11a has reached Tcf (step S10). If the count value has not reached Tcf, the count value of the counter 11a is incremented until the secondary battery 2 is connected again.

If the secondary battery 2 is connected again, it goes to step S3. On the other hand, if the count value of the counter 11a has reached Tcf in step S10, it goes to step S2.

Since the electrical apparatus 1 is assumed to be used during the time when the electrical apparatus 1 is disconnected from the charging apparatus 10, the secondary battery 2 discharges depending on the time. Accordingly, an overcharge may be prevented by carrying out a supplemental charging to compensate for the decrease in battery capacity of the secondary battery 2 that is discharged while the electrical apparatus 1 is disconnected in addition to the charging for the calculated time required for full charging.

In this case, if the charging current to the secondary battery 2 from the charging apparatus 10 is equal to the discharging current from the secondary battery 2 to the electrical apparatus 1, a compensation for the decrease in battery capacity of the secondary battery 2 is enabled by setting the charging time equal to the time when the electrical apparatus 1 is disconnected (causing discharge) from the charging apparatus 10.

When the secondary battery is detected again (step S9), since the count value of the counter 11a is incremented equal to the time when the electrical apparatus 1 is disconnected (step S8), charging is carried out for the time equal to {(the increased count value of the counter 11a)+(the count value of the counter 11a at the time when the electrical apparatus 1 is disconnected)}, i.e., {(the time during the electrical apparatus 1 is being disconnected)+(the residual charging time at the time when the electrical apparatus 1 is disconnected)}.

Figure 4:
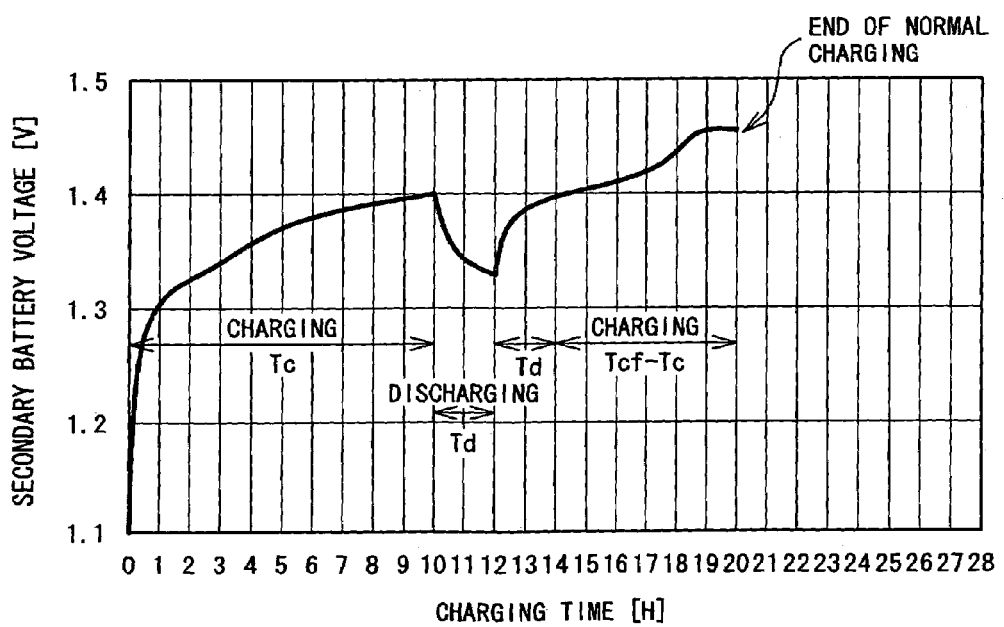
FIG. 4 is a graph for describing one embodiment of the present invention.

The foregoing control is carried out repeatedly as many times as necessary in cases when the electrical apparatus 1 is disconnected from the charging apparatus 10 in any condition (in step S4, S7) as shown in FIG. 4 and FIG. 5.

Continuing the description, it is assumed that the charging is interrupted by disconnecting the electrical apparatus 1 after the time Tc from the start of charging as shown in FIG. 4, FIG. 5 (Note that decrement of the count value of the counter 11a is carried out during the charging.). Since the count value of the counter 11a is decremented equal to the time Tc at the time when the electrical apparatus 1 is disconnected to interrupt the charging, the residual charging time is equal to the difference (Tcf−Tc) from the full charging time Tcf in the continuous charging.

Incidentally, if the electrical apparatus 1 is used for the time Td, the battery capacity of the secondary battery 2 decreases accordingly. Therefore, at the time of restarting the charging after disconnecting the electrical apparatus 1, the count value of the counter 11a is incremented by the time Td in order to compensate for the decrease in the battery capacity.

At the time when recharging of the secondary battery 2 starts, the abovementioned residual charging time (Tcf−Tc) is added with the additional time Td, thereby charging for the time equal to {Td+(Tcf−Tc)} and avoiding overcharging.

Such control is applied as many times as necessary if the electrical apparatus 1 is disconnected from the charging apparatus 10 in any conditions (step S4, step S7) and overcharging can be prevented by charging for the time {(the time during the electrical apparatus 1 is being disconnected)+(the residual charging time at the time when the electrical apparatus 1 is disconnected)}.

In the above description, in case that there is any difference between the charging current and the discharging current of the secondary battery 2, a similar control to the foregoing for preventing overcharging may be realized by changing the increment or decrement per unit time of the count value of the counter 11a.

That is, if the charging current is Ic, the discharging current is Id and the time when the electrical apparatus 1 is disconnected (for use) is Td, by setting the amount of decrement of the counter 11a per unit time to {(Id/Ic)×(the amount of increment of the counter 11a per unit time)}, the charging to compensate for decrease in battery capacity of the secondary battery 2 due to disconnection and use of the electrical apparatus 1 is carried out with the charging current Ic for the time equal to (Id/Ic)×Td.

Accordingly, at the time when the electrical apparatus 1 is once disconnected and the recharging is carried out, the charging time is the sum of the time {(Id/Ic)×Td} required for compensating for "the capacity decreased by discharging" and calculated time necessary for the full charging (the residual charging time at the time when the electrical apparatus 1 is disconnected).

In the general full charging detection systems of the secondary battery such as the minus delta V (−ΔV detection), the gradient of temperature rise in the battery (dT/dt detection), the upper temperature limit of the battery (TCO detection) and the like, at least 0.5 C mA or larger charging current is required. However, since the control is made on the charging time in the present embodiment, it is possible to obtain the charging apparatus having a function to prevent overcharging even at a relatively small charging current such as about 0.1 C mA.

Also, according to the present embodiment, since the increase and decrease of battery capacity of the secondary battery 2 due to charging and discharging is converted into the charging and discharging time, a reliable and stable overcharging protection may be achieved with a simple construction that requires no a construction to monitor the voltage of the secondary battery 2.

Figure 7:
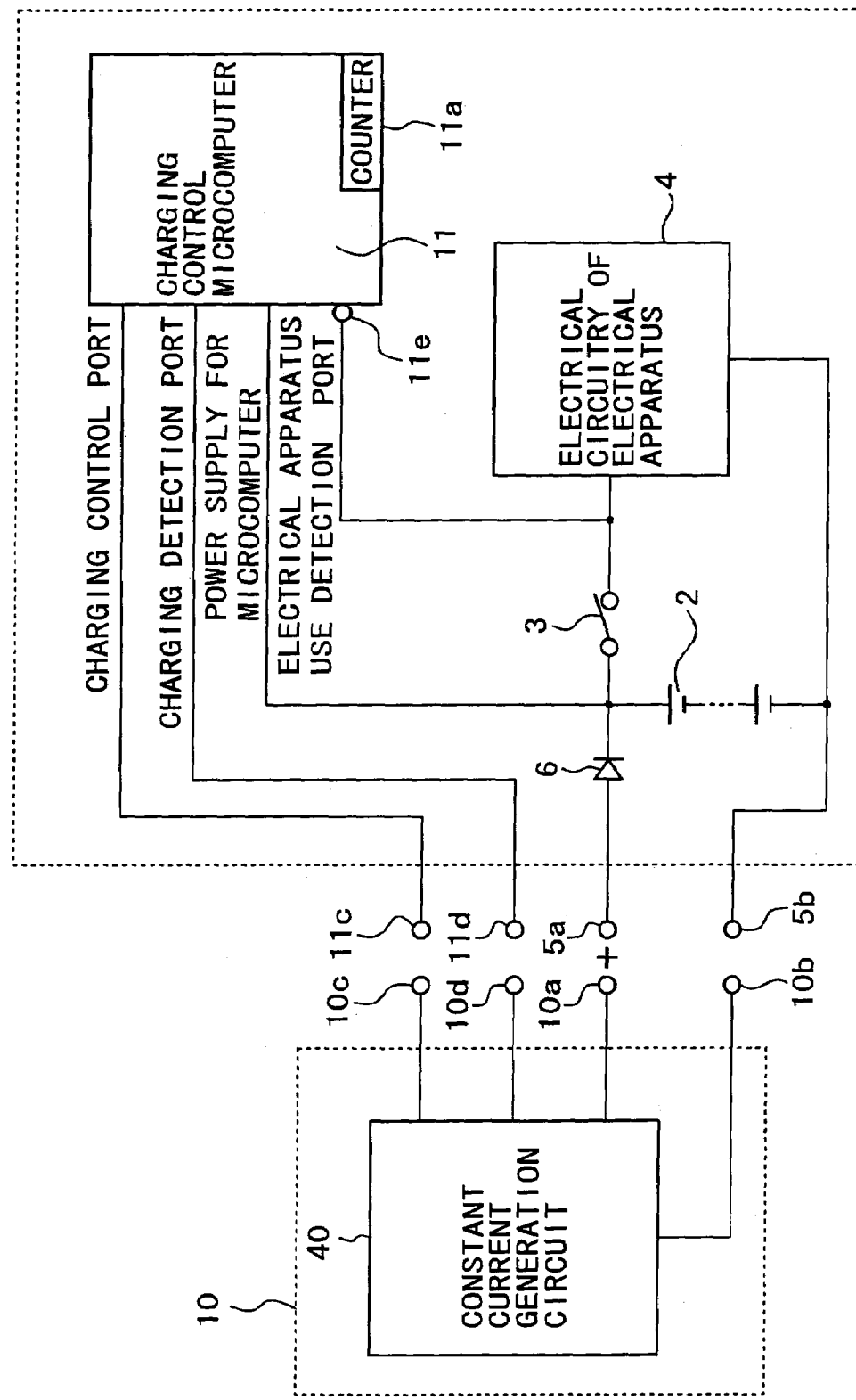
FIG. 7 is a diagram to show another embodiment of the present invention.

FIG. 7 illustrates another embodiment of the present invention. For describing about FIG. 7, portions corresponding to those in FIG. 1 have the same reference numerals and their detailed descriptions will be omitted.

In FIG. 7, the charging control microcomputer 11 in the embodiment in FIG. 1 is disposed in the electrical apparatus 1 and the charging apparatus 10 is controlled by the charging control microcomputer 11. In this embodiment, a connection point of the power switch 3 and the electrical circuitry 4 of the electrical apparatus is connected to an electrical apparatus use detection port 11e of the charging control microcomputer 11 so as to determine that the electrical apparatus is being used when the power switch 3 is on. Moreover, power is supplied from the secondary battery 2 to the charging control microcomputer 11 and the counter 11a in the charging control microcomputer 11 is not reset by turning on or off the power switch 3.

Additionally, the charging apparatus 10 is provided with a constant current generation circuit 40 for outputting the charging current to the output terminals 10a, 10b. A charging control terminal 10c of the constant current generation circuit 40 is connected to the charging control port 11c of the charging control microcomputer 11, so as to control the constant current generation circuit 40 by the charging control microcomputer 11, while a charging detection terminal 10d of the constant current generation circuit 40 is connected to the charging detection port 11d of the charging control microcomputer 11, thereby informing the charging control microcomputer 11 whether the secondary battery is being charged or not.

In the charging control microcomputer 11, if charging of the secondary battery 2 is detected by the charging detection port 11d, the count value of the counter 11a is decremented. If no-charging is detected, the count value of the counter 11a is incremented.

Other constructions are the same as the embodiment in FIG. 1. It is easily understood that the same functions and effects as the embodiment in FIG. 1 can be achieved also by the embodiment in FIG. 7.

It should be understood by those skilled in the art that various modifications, combinations, sub-combinations and alterations may occur depending on design requirements and other factors insofar as they are within the scope of the appended claims or the equivalents thereof.

According to the embodiments of the present invention, since charging and discharging of the secondary battery are controlled on the basis of the charging and discharging time, the charging apparatus having an overcharging prevention function can be achieved even if the charging current is relatively small such as about 0.1 C mA.

Further, according to the embodiments of the present invention, since increase or decrease in battery capacity of the secondary battery due to charging and discharging is converted into the charging and discharging time, a reliable and stable overcharging prevention may be achieved with a simple construction that requires no construction to monitor the voltage of the secondary battery.

What is claimed is:

1. A charging apparatus that discontinues a charging operation at a preset expiration time period comprising:
    an interface configured to connect to a power source for recharging; and
    variable control means for controlling the preset expiration time period in response to a disconnection of the power source such that the time period remaining before reaching the preset expiration time period and a duration of the interruption are utilized to generate a second preset expiration period employed by the variable control means upon reconnection of the power source.

2. The charging apparatus according to claim 1, wherein the charging apparatus continues a trickle charging after the expiration time period of a timer.

3. The charging apparatus according to claim 2, wherein the trickle charging after the expiration time period of a timer is a pulse charging.

4. The charging apparatus that discontinues a charging operation at a preset expiration time period, the charging apparatus comprising:
    a variable controller configured to control the preset expiration time period in response to a disconnection of the power source such that the time period remaining before reaching the preset expiration time period and a duration of the interruption are utilized to generate a second preset expiration period employed by the variable controller upon reconnection of the power source.

5. The charging apparatus of claim 1, wherein the charging apparatus provides a charge current of 0.1 C mA, C being a charging capacity (mAh) of the power source.

* * * * *